Figure 1:
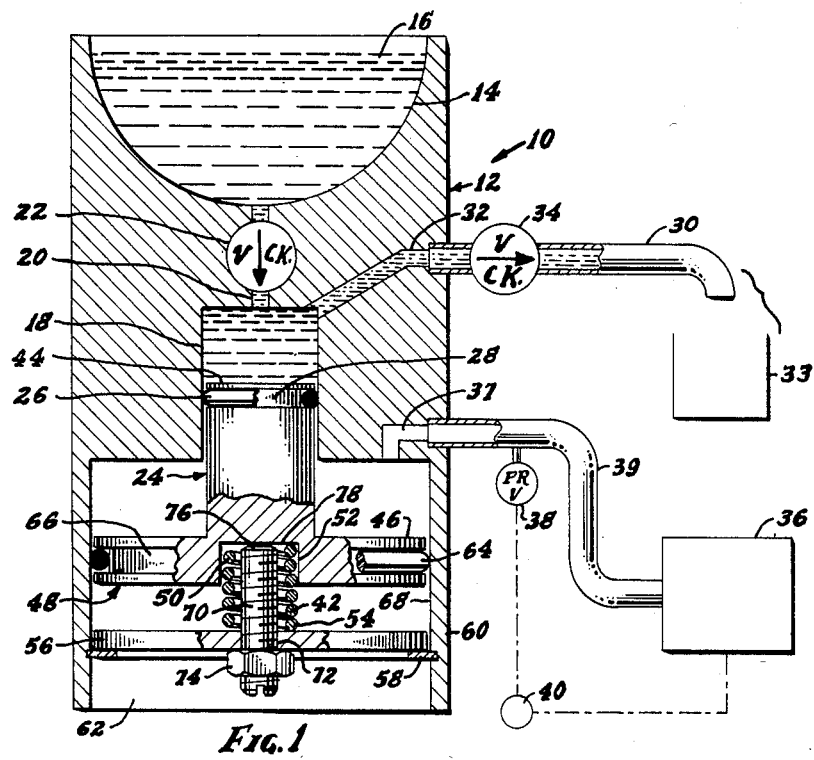

United States Patent [19]

Starr

[11] Patent Number: 4,793,524
[45] Date of Patent: Dec. 27, 1988

[54] INTEGRATED REAGENT CONTAINER AND METERED DISPENSER MEANS

[75] Inventor: Maurice Starr, Indianapolis, Ind.

[73] Assignee: American Monitor Corporation, Indianapolis, Ind.

[21] Appl. No.: 259,004

[22] Filed: Apr. 30, 1981

[51] Int. Cl.4 .................... G01F 11/06; G01F 11/30
[52] U.S. Cl. .................... 222/309; 222/333; 222/334; 222/340
[58] Field of Search .......... 222/309, 334, 14–16, 222/71, 472, 481.82, 333, 373, 380, 309, 340

[56] References Cited

U.S. PATENT DOCUMENTS

| | | | |
|---|---|---|---|
| 1,984,296 | 12/1934 | Witter | 222/334 |
| 2,140,679 | 12/1938 | McKeever | 222/334 |
| 2,760,690 | 8/1956 | Whaley | 222/309 |
| 3,386,622 | 6/1968 | Cox et al. | 222/333 |
| 3,851,801 | 12/1974 | Roth | 222/309 X |

Primary Examiner—Robert B. Reeves
Assistant Examiner—Russell D. Stormer
Attorney, Agent, or Firm—Robert A. Spray

[57] ABSTRACT

A metering-type dispenser device, of integrated nature having its own liquid reservoir, particularly for the metered dispensing of liquid reagents in a chemical assay, in which there is an independence of the liquid reservoir from any pressure such as used in activating the pumping stroking of the pumping head member of the device.

4 Claims, 2 Drawing Sheets

INTEGRATED REAGENT CONTAINER AND METERED DISPENSER MEANS

The present invention relates to a reagent container device, and more particularly provides a reagent container which has its own dispenser means for dispensing metered amounts of liquid reagent for an assay procedure.

Concepts of the invention advantageously provide an integrated device, and desirably a whole set of such devices, providing the advantage of a unitary container and metered dispensing means for each one of a plurality of liquid reagents, especially desirable for use with chemical or biological assay equipment.

As is of course well known, chemical assays have long been in increasing use for such vital tasks as determining quantities of various constituents of body fluids; and such assays provide very beneficial and life-bettering and even life-saving benefits. And for such assays, one or more liquid reagents must be added, in accurate amounts to the sample being assayed; and various assays require different combinations of reagents.

Particularly advantageous for use in such assays, the integrated features of container and metered dispensing means, in each single unit of a set of the devices of this invention, provide several advantages, such as convenience, rapidity, minimizing of errors, lack of contamination as between supplies of a plurality of reagents, and lack of need to rinse or purge dispensing lines, all particularly advantageous in use of a plurality of reagents needed to be used in metered amounts or proportions, with automated or semi-automated assay equipment.

The concepts, more particularly, provide, for each one of a set of such devices, in a single body member, both a reagent-retaining cavity or reservoir and a metering cavity, and each one of the devices of the set has its own dispenser pump means by which reagent liquid is drawn from the retaining cavity and int a altering cavity and thereupon dispensed in metered amounts out a dispenser outlet, all these components being a part of each of these integrated devices of the set; and thereby each of the integrated devices may be used to store and dispense a metered amount of a particular reagent needed for the assay, with the most that need be done to change from one of such devices to another being a change of whatever pumping actuator is needed for the reagent unit to be used.

Thus the reagents, as selected for each assay or series of assays, are conveniently, quickly, and accurately provided for the assay or assays, with but little change-over time in going from one reagent to another, and with the other advantages such as the lack of need to rinse or purge lines, as indicated above.

These advantages are increased in the use of these integrated devices with automated or semi-automated analyzers; for the automatic means or features of such analyzers can be readily utilized to provide the control and/or actuator means. For example, the automatic means may be advantageously utilized to control the number of strokes and thus the metered amount of reagent liquid to be dispensed; and the lack of need of purging and/or washing when changing reagents gives particularly advantageous benefits in utilizing the present invention in the rapidity of assays desirably accomplished by automated or semi-automated equipment.

The nature and signficance of the present inventive concepts for use in such assays may perhaps be best considered and appreciated as to conceptual signficance by realistically considering container devices of many types known and used for many years for many purposes in the prior art, particularly realizing that there have been many types of containers which have some sort of dispenser means, and which can be considered to illustrate or represent some sort of integrated container and dispenser.

After all, even a drinking glass or mug may be considered as a sort of integrated liquid container and a dispenser, the latter being the mouth or rim of the glass or mug. And countless types of well-known devices have had for scores of years a liquid container integral to some extent with a mechanical and metered outlet. A gasoline pump, as an example, has a reservoir for containing a volume of liquid, together with a metered dispensing means. A thermos jug of a type having a valved outlet can be considered a form of a combined container and dispenser for liquids. A syringe, various beverage dispensers, and even a blood-transfusion installation, each can be said to illustrate widely different equipment of prior art which provide a liquid container with a metered or controlled dispensing means. Manufacturing installations for providing a mixed-solution product further illustrate devices having both a container and a metered dispenser outlet.

Further, in considering the present invention from conceptual standpoint, it is to be noted that any of these prior art devices or installations can be and sometimes are provided as a set; and any individual one of them can be considered an integrated container-and-dispenser unit of a set, a unit which, like a device of the present invention, can be kept for a single liquid with minimal wash-up requirements and minimal change of mixing, contamination, or dilution with other liquids.

However, in contrast to all such variety of examples the present invention provides a very special combination of features which, in their particular combination, achieve a very advantageous integrated reagent container and metered dispenser unit, which provides a novel and advantageous device for a very specialized and long-used procedure of adding liquid reagents in metered quantities to an assay solution. Conceptually, the present invention is to be noted as further a departure from prior art devices, when it is realized that certain of such prior art devices, having the basic components of container and metered dispenser, could even conceivably be adapted to utilize the identical components provided by the present invention; and the lack of such combination of components in prior art devices helps show the uniqueness not only of the components but of the concepts themselves, and it also shows the conceptual departure made by this invention over other devices which can provide an integrated container-and-dispenser operativity.

From the above, and in spite of the desirable advantages of the present invention over those of the prior art, it is of course to be noted that the present invention does not at all assert uniqueness as to the basic or abstract idea of a unitary container and metered dispenser; instead the unique novelty here is in the combination of a unitary device which has not only a reservoir and a metered outlet, but also in combination therewith, has and provides the particular concepts and features which provide an effective and easily-cleanable and accurately metered dispenser of unitary small batches of liquid to be dispensed from the reservoir, the metered dispenser being one which requires only a very small amount of space yet which achieves high and repeatable accuracy of dispensing, of very small quantities, all in an integrated body member or housing which is so small that a quantity of several may be positioned in a small work-area of an assay station, and with switching from one liquid to another being not only easy and substantially instantaneous but with no contamination of either liquid and requiring no rinsing or purging to avoid reagent contamination or reagent dilution.

Figure 2:
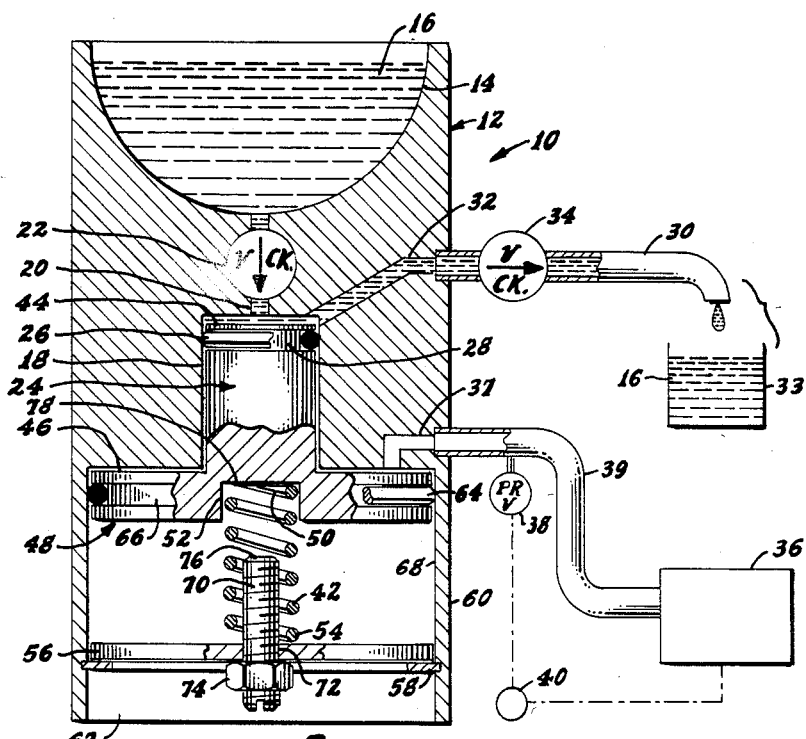
Figure 3:
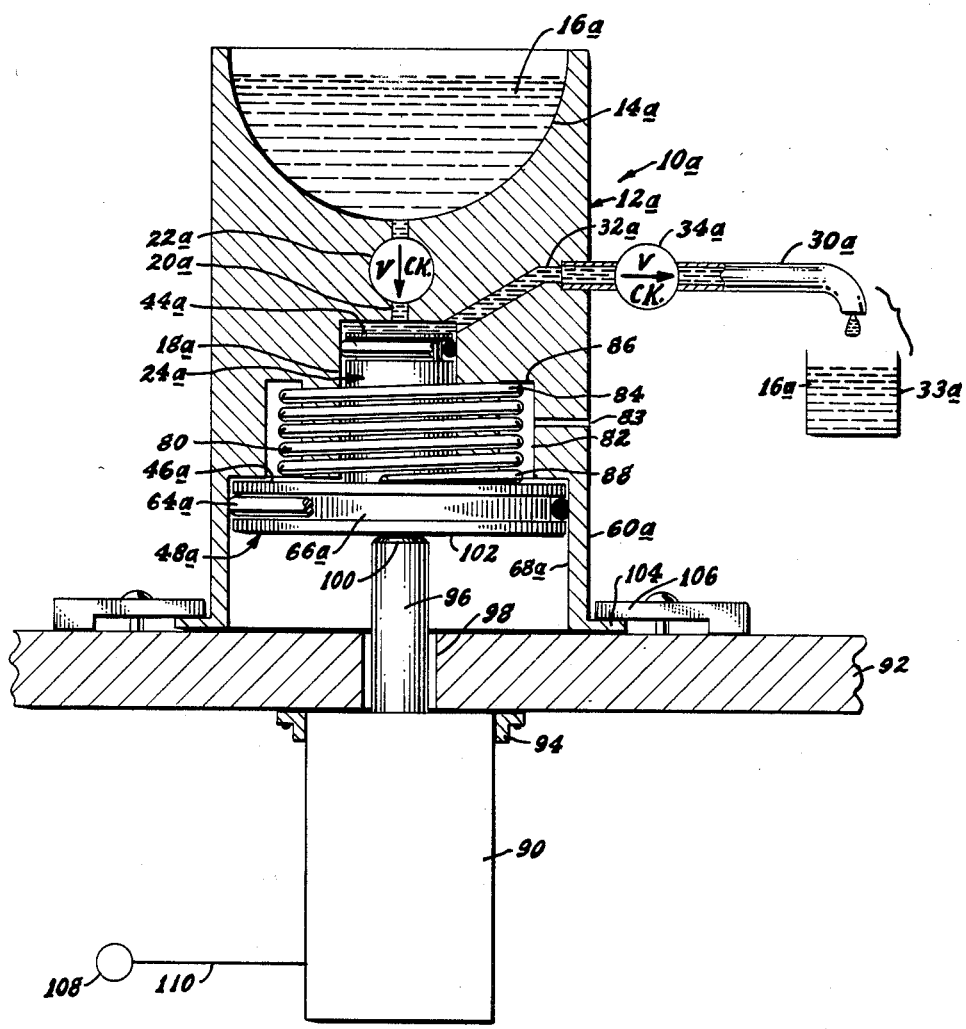

The above is of introductory and somewhat generalized nature, indicating in general terms the concepts and particularly advantageous use of the present invention. More particulars of the features, concepts, and details of the invention are set forth in the following, more detailed description of illustrative embodiments, reference being had to the accompanying somewhat schematic and diagrammatic drawings, in which:

FIG. 1 is a vertical cross-sectional view, in enlarged scale, through an integrated reagent container and metered dispensing means according to one embodiment of the invention, the parts being shown in a position in which some reagent liquid has been drawn from the reagent reservoir into the metering cavity;

FIG. 2 is a similar vertical cross-sectional view of the integrated container and dispensing means of FIG. 1, but with a subsequent stroke having pumped a metered quantity of a reagent liquid into the associated vessel; and FIG. 3 is a vertical cross-sectional view through another embodiment of the integrated reagent container and metered dispensing means according to the inventive concepts, the parts being shown in the subsequent-stroke stage as in FIG. 2.

As shown in the drawings, both embodiments here shown as illustrative of the inventive concepts provide an integrated reagent container and dispenser 10, which has a body member means 12 having both a reagent-retaining cavity 14, for reagent liquid 16, and a metering cavity 18.

There is provided in body member 12 a first passageway means 20, having a first check valve means 22, extending between and thus interconnecting the two cavities 14 and 18, the check valve 22 being of a one-way or check valve type which permits reagent liquid flow between the cavities 14 and 18 only in a direction from the reagent-containing cavity 14 to the metering cavity 18.

A piston means 24 is operatively disposed in the metering cavity 18; and an operatively tight seal is provided by an O-ring 26 carried in a circumferential groove 28 of the piston 24, sealingly bearing against the inner wall of the metering cavity 18 although permitting relative movement of the piston 24 and the cavity 18.

There are provided power stroke means for operatively reciprocating the piston 24 relative to the metering cavity 18, as more fully set forth below as to each of the embodiments here illustrated.

For dispensing discharge of reagent fluid 16, the body member means 12 is shown as provided with a dispensing outlet means 30 exteriorly of the body member means 12, and the body member 12 is also provided with second passageway means 32 which communicates the metering cavity 18 with the dispensing outlet means 30; and there is provided a second one-way or check valve means 34 which permits flow of reagent liquid 16 through the second passageway 32 only in a direction from the metering cavity 18 to the dispensing outlet means 30.

As shown particularly by comparing the sequential showings of FIGS. 1 and 2, the stroking of the piston means 24 is thus operative, in its intake stroke movement in a first direction (here downwardly to the FIG. 1 position of the piston 24), to draw a batch of reagent liquid 16 from the reagent-retaining cavity 14 through the first passageway means 20 and into the metering cavity 18; and the piston 24, by its subsequent (here upward) compression stroke movement in the other direction (to the FIG. 2 position) is operative to dispense a corresponding and thus metered batch of the reagent liquid 16 outwardly from the body member means 12 through the second passageway means 32, to the outlet 30 and into the vessel 33 which is to receive the metered batch of reagent liquid 16.

The metered amount of reagent liquid 16, per stroke, is a function of the effective cross-sectional area of the piston 24 and metering cavity 18 and the length of stroke of the piston 24; and means (as described more fully below) are provided which limit the length of the stroke of the piston means 24, this achieving the metered amount of reagent liquid 16 to be dispensed per stroke of the piston 24.

In the embodiment illustrated in FIGS. 1 and 2, compressed air is used as an actuator. That is, the intake stroke of the piston means 24 is shown as achieved by the provision of an associated supply means 36 which supplies compressed air, through a passageway 37 in the body member 12, operatively against a portion of the piston means 24, thus achieving a pressure differential which urges the piston means 24 in one direction of its stroke (here shown as the downward direction of stroke), with a pressure-relief means 38 being shown in the compressed air line 39 for relieving that pressure and that pressure-differential for a piston stroke in the other (upper as here shown) direction.

The actuator means, schematically indicated as 40, for actuating the compressed air supply means 36 and pressure relief valve 38, is/are coordinated so that the compressed air supply to the passageway 37 and the venting of that passageway 37 by the pressure relief valve 38 are alternating or pulsing in nature, thus achieving the stroking actuation of the piston 24, with spring means 42 being shown as provided to urge the piston means 24, in the other one (here upward) of its directions within the pressure in passageway 37 is relieved by the pressure relief valve 38, thus achieving the compression stroke.

The form of piston means 24 as shown is of stepped-piston type. One surface 44 of the piston 24, that is the upper surface of the smaller-diameter portion of the piston 24, operatively faces the metering cavity 18. The other surface 46 of the piston 24, to which the compressed air is supplied through passageway 37, is in a region of the body member 12 which is out of communication with the metering cavity, this non-communication being achieved by the O-ring seal 26 between the piston 24 and the inside wall of the metering cavity 18.

The surface 44 of the stepped-type piston means 24 which faces the metering cavity 18 is the piston head portion of the relatively lesser diameter; and the other surface 46 of the stepped-type piston means 24, which is the piston surface acted upon by the pressure of compressed air to achieve the intake (downward as shown) stroke, is the piston head portion 48 of the relatively larger diameter.

In the embodiment shown in FIGS. 1 and 2, the spring 42 causes the compression stroke of the piston means 24. In the form shown, the spring's upper end 50 is shown as received in a downwardly-facing recess 52; and the spring's lower end 54 bears against a thrust plate 56 which is shown as supported by a retainer or snap ring 58.

The lower end 60 of the body member 12 is provided with a hollow bore 62; and it is in the bore 62 that the larger-diameter piston-portion 48 and its air-pressured surface 46 moves. An O-ring 64 carried in a circumferential groove 66 of the larger piston-portion 48 seals against the inner wall 68 of the lower body-member portion 60, to provide operative air-tightness for operativity of the compressed air against piston-surface 46 to achieve the intake stroke.

Fixed length of the intake stroke is shown as adjustably provided by a bolt 70 which threadedly engages in opening 72 in thrust plate 56, a Jam or lock nut 74 serving to maintain a selected setting of the bolt 70 such that (see FIG. 1) the upper end 76 of the bolt 70 is engaged by the downwardly-facing face 78 of piston-recess 52 to provide the desired length of travel of the piston means 24 in the intake (downward as here shown) stroke.

In use, the actuator 40 is caused to effect however many strokes are desired to obtain the desired quantity of metered reagent batches or volumes to be dispensed into the receiver vessel 33.

To change reagents, the integrated nature of the reagent container and dispenser means 10 provides much convenience and rapidity; and no purging or rinsing of lines is required. All that is required is to disconnect air line 39 from the air passageway 37 of one body member 10, and position a different body member 10, having a different reagent liquid 16, in a location such that its dispenser outlet 30 will dispense into the receiving vessel 33, and connect the air-supply line 3 to the air supply passageway 37 of the different body member 10.

The embodiment of FIG. 3 is quite similar in many respects; and components of it which are or may be identical as in the embodiment of FIGS. 1 and 2 are indicated for brevity merely by the use of the same reference numerals but with a suffix "a".

The differences of the embodiment of FIG. 3, in contrast to that of FIGS. 1 and 2, are in the stroking means. More particularly, as shown in FIG. 3, a spring 80 is seated in an annular recess 82 (vented at 83) which opens downwardly in the body member 12a; and the upper end 84 of that spring 80 bears against the downwardly-facing face 86 of the recess 82, and the lower end 88 of the spring 80 bears against the surface 46a of the larger diameter portion 48a of the piston means 24a.

It is thus seen that in the FIG. 3 embodiment the spring 80 acts to cause the intake (here downward) stroke of the piston means 24; and that intake stroke draws reagent liquid 16a from the reservoir cavity 14a through the passage 20a and the check valve 22a into the metering cavity 18a.

Achieving the compression (here upward) stroke of the piston means 24a, a solenoid 90 is mounted under the work table 92 by a support bracket or ring 94, with the plunger 96 of the solenoid 90 freely extending upwardly through an opening 98 in the work table 92.

The upper end 100 of the solenoid plunger 96 bears against the lower and downwardly-facing surface 102 of the larger-diameter portion 48a of the piston means 24a; and the body member 10a is releasably retained in the proper position, operatively registering or centered over the table-hole 98 and solenoid plunger 96, by being shown as releasably held and positioned by retainer ears 104 of body member 12a being retainingly slipped under suitable mounting ears 106 mounted onto the work table 92.

The solenoid 90 thus serves to achieve the compression stroke in this FIG. 3 embodiment, causing the metered batch of reagent liquid 16a to be forced from the metering chamber 18a out through discharge passage 32a and dispenser outlet 30a to the reception vessel 33a.

Control means, indicated schematically at 108 and line 110, will be understood as achieving pulsing activation of the solenoid 90; and the metered volume of reagent liquid 16a per stroke is a function of the effective diameter of the metering chamber 18a and the piston surface 44a which moves in it, and by the length of travel of the solenoid plunger 96.

To change reagents with the embodiment of FIG. 3, all that needs to be done is to remove one body member 12a from the mounting lugs 106 and place another body member 12a in the said position, in operative registry over the hole 98 and solenoid plunger 96.

Common to both embodiments is the concept of an integrated body member having both a reagent-reservoir chamber and a metering chamber, and with force means which alternately cause the piston means 24 or 24a to stroke in each of its directions of a reciprocating stroking movement, the force means operatively bearing against the piston means to achieve that actuation, but at only locations thereon which are spaced from and out of communication with both the metering cavity 18 or 18a and the passageway means 32 or 32a by which the reagent is caused to be dispensed in the compression stroke.

And, as stated above, there are also the other components and concepts common to both embodiments, as indicated by the similarity of reference numerals; but both embodiments provide the advantages of a new and advantageous integrated body member having both the reagent-reservoir and a metered dispensing means, eliminating the bother and other disadvantages of purging or other cleaning when changing reagents used in the assay.

The concept of "integrated" as herein indicated does not necessarily mean a unitariness in the sense of a one-piece body member, even though such is shown by the components 12 and 12a; but, rather it is a unitariness in the sense that each reagent liquid has both its own reservoir and its own metered dispensing means, thus achieving an integration of those features in an operative sense.

It is thus seen that an integrated reagent container and metered dispensing means according to these inventive concepts, provides a desired and advantageous device, particularly in a set thereof, yielding the high desirability and advantage of quick and easy changeover from one reagent to another, with no need of purging lines, and with avoidance of reagent-contamination by other reagents being used in the assay.

Accordingly, it will thus be seen from the foregoing description of the invention according to these illustrative embodiments, considered with the accompanying drawings, that the present invention provides new and useful concepts of a novel and advantageous integrated reagent container and metered dispensing means yielding desired advantages and characteristics particularly for assays using liquid reagents in automated or semi-automated procedures, and accomplishing the intended objects, including those hereinbefore pointed out and others which are inherent in the invention.

Modifications and variations may be effected without departing from the shape of the novel concepts of the invention; accordingly, the invention is not lifted to the specific embodiment or form or arrangement of parts herein described or shown.

What is claimed is:

1. An integrated reagent-container and dispenser, comprising, in combination:

a body member means, the body member means being provided with a reagent-container reservoir and a metering cavity, and a first passageway means having a first check valve means, between the said reservoir and the said cavity, of a type permitting reagent liquid flow between the said reservoir and the said cavity only in a direction from the reagent-containing reservoir to the metering cavity, a piston means operatively disposed in the metering cavity, actuation means for operatively reciprocating the piston means relative to the metering cavity, the body member means being provided with a dispensing outlet means exteriorly of the body member means and with second passageway means communicating the metering cavity with the dispensing outlet means, there being provided a second check valve means permitting flow of liquid through the second passageway means only in a direction from the metering cavity to the dispensing outlet means, the reciprocating of the piston means thus being operative, in its movement in one direction, to draw a batch of reagent liquid from the reagent-container reservoir through the first passageway means and into the metering cavity, and in its movement in the other direction being operative to dispense a corresponding batch of reagent liquid outwardly from the body member means through the second passageway means, the said reagent-container reservoir being non-communicating with any pressure used in achieving the reciprocating of the piston means; and the movement of the piston means in dispensing a batch of reagent liquid thus dispensing a metered amount, independent of pressure used in achieving piston-movement actuation, and avoiding any reagent entering the metering cavity during the dispensing movement of the piston, and avoiding contamination of the reagent supply in the container reservoir by the pressure source;

in which the piston means is of stepped-piston type, one surface of which operatively faces the metering cavity and the other surface of which in movement of the piston means is in a region of the body member means which is out of communication with the metering cavity;

in a combination in which tee said other surface of the piston means is provided with a source of compressed air for causing a movement of the piston means in one direction, there being spring means which cause the piston means to move in the other direction upon relief of the pressure of the compressed air.

2. The invention s set forth in claim 1 in a combination in which the said one surface of the stepped-type piston means is the piston head portion of the relatively lesser diameter, and the said other surface of the stepped-type piston means is the piston head portion of the relatively larger diameter.

3. An integrated reagent container and dispenser, comprising, in combination:

a body member means, the body member means being provided with a reagent-container reservoir and a metering cavity, and a first passageway means having a first check valve means, between the said reservoir and the said cavity, of a type permitting reagent liquid flow between the said reservoir an the said cavity only in a direction from the reagent-containing reservoir to the metering cavity, a piston means operatively disposed in the metering cavity, actuation means for operatively reciprocating the piston means relative to the metering cavity, the body member means being provided with a dispensing outlet means exteriorly of the body member means and with second passageway means communicating the metering cavity with the dispensing outlet means, there being provided a second check valve means permitting flow of liquid through the second passageway means only in a direction from the metering cavity to the dispensing outlet means, the reciprocating of the piston means thus being operative, in its movement in one direction, to draw a batch of reagent liquid from the reagent-container reservoir through the first passageway means and into the metering cavity, and in its movement in the other direction being operative to dispense a corresponding batch of reagent liquid outwardly from the body member means through the second passageway means, the said reagent-container reservoir being non-communicating with any pressure used in achieving the reciprocating of the piston means; and the movement of the piston means in dispensing a batch of reagent liquid thus dispensing a metered amount, independent of pressure used in achieving piston-movement actuation, and avoiding any reagent entering the metering cavity during the dispensing movement of the piston, and avoiding contamination of the reagent supply in the container reservoir by the pressure source;

in which the piston means is of stepped-piston type, one surface of which operatively faces the metering cavity and the other surface of which in movement of the piston means is in a region of the body member means which is out of communication with the metering cavity;

in a combination in which pulsating force means are operative against the piston means to cause it to move in one of its directions, and in which there are spring means provided which operatively thrust against the body member means and the said other surface of the piston means for operatively causing the piston means to move in the other of its directions of reciprocating movement.

4. The invention as set forth in claim 3 in a combination in which the said one surface of the stepped-type piston means is the piston head portion of the relatively lesser diameter, and the said other surface of the stepped-type piston means is the piston head portion of the relatively larger diameter.

* * * * *

UNITED STATES PATENT AND TRADEMARK OFFICE
CERTIFICATE OF CORRECTION

PATENT NO. : 4,793,524

DATED : December 27, 1988

INVENTOR(S) : Maurice Starr

It is certified that error appears in the above–identified patent and that said Letters Patent is hereby corrected as shown below:

Col. 1, line 39    Change "int a altering" to "into a metering".

Col. 4, line 48    Change "within" to "when".

Col. 5, line 19    Change "Jam" to "jam".

Col. 5, line 37    Change "3" to "39".

Col. 6, line 21    Change "said" to "same".

Col. 7, line 59    Change "tee" to "the".

Col. 7, line 66    Change "s" to "as".

Signed and Sealed this

Tenth Day of October, 1989

Attest:

DONALD J. QUIGG

Attesting Officer

Commissioner of Patents and Trademarks